United States Patent [19]

Furuya et al.

[11] 3,856,885

[45] Dec. 24, 1974

[54] PROCESS FOR MOLDING THERMOSETTING RESINOUS COMPOSITIONS

[75] Inventors: Akio Furuya, Yokohama; Yukihiko Ishimaru, Ohtsu, both of Japan

[73] Assignees: Dai Nippon Toryo Co., Ltd.; Leben Utility Co., Ltd., both of Osaka-shi, Japan

[22] Filed: Oct. 26, 1972

[21] Appl. No.: 300,998

[30] Foreign Application Priority Data
  Oct. 28, 1971  Japan.............................. 46-85758
  Oct. 28, 1971  Japan.............................. 46-85757

[52] U.S. Cl. ............................................. 260/862
[51] Int. Cl. ............................................ C08f 21/00
[58] Field of Search .................................... 260/862

[56]  References Cited
  UNITED STATES PATENTS
  3,227,665  1/1966  Fourcade et al..................... 260/2.5
  3,291,636  12/1966  Reighter et al..................... 117/212
  3,700,624  10/1972  Adachi et al........................ 260/31.6
  3,721,642  3/1973  Schalin et al........................ 260/40 R

*Primary Examiner*—Melvin Goldstein
*Assistant Examiner*—E. A. Nielsen
*Attorney, Agent, or Firm*—Waters, Roditi, Schwartz & Nissen

[57]  ABSTRACT

This invention relates to a process for molding a thermosetting resinous composition, which comprises heating a liquid composition comprising an unsaturated alkyd resin, a vinyl chloride resin, a vinyl monomer and/or a reactive plasticizer, and a polymerization initiator at a temperature ranging from 80° to 160°C. to such an extent that the composition is not completely cured, cooling the composition to obtain a non-tacky partially-cured composition of a suitable form, and heating said partially-cured composition at a temperature ranging from 120° to 180°C. to complete the curing.

10 Claims, 3 Drawing Figures

PROCESS FOR MOLDING THERMOSETTING RESINOUS COMPOSITIONS

BACKGROUND OF THE INVENTION i. Field of the Invention

This invention relates to a process for molding a thermosetting resinous composition of the unsaturated alkyd resin type.

More specifically, this invention relates to a process for preparing molded articles having excellent hardness, flexural modulus, chemical resistance, etc., which comprises heating a starting liquid composition comprising an unsaturated alkyd resin, a vinyl chloride resin, a vinyl monomer and/or a reactive plasticizer, and a polymerization initiator at a temperature ranging from 80° to 160°C to obtain a partially-cured composition of a three-dimensional net-like structure which exhibits excellent stability during a long period of storage, and further heating the partially-cured composition.

ii. Description of the Prior Art

Mixtures comprising an unsaturated polyester resin and a polymerizable monomer such as styrene and an acrylic acid ester have been known. Molding of such mixtures is accomplished by dispersing a pigment and a filler into the mixture, impregnating the mixture with a fibrous reinforcing agent and curing it under heating or conducting the curing reaction at room temperature by employing a polymerization promoter in combination with a polymerization initiator for activating the polymerization initiator. By these procedures solid molded articles are prepared from the above mixtures. Mixtures of this type are defective in that since they are liquid at room temperature, their handling is troublesome and since it is difficult to conduct the molding of these mixtures continuously, the molding efficiency is low.

As means for overcoming these defects, methods comprising forming solid-like compositions by modifying liquid thermosetting resins or compositions have recently been proposed. For instance, in unsaturated polyester resins, adoption of (1) a polymerizable monomer solid at room temperature which can give a dry premixture of (2) a sheet molding compound (SMC) or bulk molding composition (BMC) formed by adding a metal oxide such as MgO or a metal hydroxide such as $Ca(OH)_2$ in a solution of an unsaturated polyester resin and styrene has been known. Molded articles prepared from these conventional unsaturated polyester resins have the following defects:

1. Strain occurs owing to great shrinkage during curing.
2. Hardness is considerably high and so is brittleness.
3. The molded article is easily combustible.
4. Yellowing or deterioration occurs under ultraviolet rays.
5. The molded article has poor alkali- or boiling water-resistance because the ester linkage is readily hydrolyzed.
6. Cracks and warps are easily formed in a thick portion of the molded article because of the exothermic reaction.
7. The molded article has poor workability because of short pot life.

As a method for obtaining molded articles simply from vinyl chloride resin compositions, there has been known a method comprising incorporating a nonreactive plasticizer into vinyl chloride resin powder for paste to form a polyvinyl chloride plastisol, melting the sol by heating and converting the sol to a gel to obtain a molded article (U.S. Pat. No. 2,943,952, U.S. Pat. No. 3,066,110 and British Pat. No. 694,444). Molded articles prepared from such polyvinyl chloride plastisols, however, have the following defects:

1. The molded article has low hardness and low heat distortion temperature.
2. The oil resistance and solvent resistance of the molded article are poor.
3. The strain resistance of the molded article is poor.
4. Deterioration and softening is caused in materials in contact with the molded article by bleeding of the plasticizer contained therein.

As compositions improved to overcome these defects, there have been proposed compositions comprising a vinyl chloride resin and a reactive plasticizer, and compositions comprising a vinyl chloride resin, a vinyl monomer and a nonreactive plasticizer (U.S. Pat. No. 2,849,332, U.S. Pat. No. 2,918,736, U.S. Pat. No. 3,133,825, U.S. Pat. No. 3,557,046 and U.S. Pat. No. 3,557,049). However, in these compositions sufficient improvement of chemical resistance, hardness, heat distortion temperature and other properties cannot be attained. Further, since these compositions are liquid at room temperature, their handling is troublesome and it is difficult to adopt an automatic molding process using SMC or the like.

For overcoming these defects, there has recently been proposed a method comprising heating a composition comprising a vinyl chloride resin and a reactive plasticizer such as glycol diacrylate to a temperature ranging from 90° to 120°C, thereby swelling the vinyl chloride resin with the plasticizer to obtain a gel, and heating the gel at 120° to 200°C to obtain a final cured molded article (U.S. Pat. No. 3,557,046).

Also mixtures comprising a vinyl chloride resin and an unsaturated polyester resin as a reactive plasticizer have been known (U.S. Pat. No. 3,133,825, U.S. Pat. No. 3,363,028 and British Pat. No. 765,562).

These mixtures, however, are very inferior in storage stability owing to low compatibility between the two resins. Accordingly, only a very small amount of an unsaturated polyester resin is incorporated in a vinyl chloride resin. Further, the resulting composition is generally highly viscous, and since the compatibility between the unsaturated polyester resin and vinyl chloride resin is poor, when both are mixed, the viscosity is abruptly increased and gelation occurs. Still further, it is very difficult to carry out the processing or coating operation, because the composition has a very short pot life. Moreover, the product obtained by curing such mixture is opaque and brittle, and therefore, it cannot be applied to practical use.

SUMMARY OF THE INVENTION

This invention relates to a process for molding thermosetting resinous compositions, which can overcome the above-mentioned defects of conventional techniques.

One of the inventors previously filed a patent application for a composition comprising an unsaturated polyester resin, a vinyl chloride resin, a reactive plasticizer and a polymerization initiator (Patent Application Ser. No. 138,316 filed Apr. 28, 1971, now U.S. Pat. No. 3,700,624). This invention relates to improvements of the invention of this prior application.

It is a primary object of this invention to provide a partially-cured composition which is very stable when stored for a long period of time. Another object of this invention is to provide a partially-cured composition which is non-tacky and can be handled with ease, and which can be easily cut, bent and processed. A still further object of this invention is to provide a final molded article having excellent hardness, flexibility, impact resistance, abrasion resistance, chemical resistance, heat resistance and flame resistance.

This invention will now be illustrated by reference to two embodiments thereof.

In brief, the process of this invention includes the following two steps, namely (i) the step of heating at a temperature ranging from 80° to 160°C a liquid composition obtained by sufficiently agitating and blending a mixture comprising (A) 5 to 70% by weight of an unsaturated alkyd resin having an average degree of condensation of at least 4 and a number average molecular weight of at least 1,000, (B) 20 to 70% by weight of a vinyl monomer, (C) 10 to 65% by weight of a vinyl chloride resin and (D) 0.2 to 3% by weight of a polymerization initiator, to such an extent that the composition is not completely cured and cooling the composition to obtain a non-tacky solid-like partially-cured composition of a suitable form, and (II) the step of heating the partially-cured composition at a temperature ranging from 120° to 180°C to complete the curing.

As the unsaturated alkyd resin (A) in the step of (I), there may be preferably used condensation products formed from (i) 1 mole equivalent of an unsaturated dibasic acid or a mixture thereof with a saturated aliphatic or aromatic dibasic acid and (ii) 1 – 1.2 mole equivalents of a polyhydric alcohol which consists of neopentyl glycol or 1,6-hexane diol alone or which consists of a mixture of at least 0.2 mole equivalent of neopentyl glycol, 1.6-hexane diol or both with another glycol.

As the vinyl monomer (B) in the step (I), styrene alone or its mixture with another vinyl monomer may be preferably used.

A preferable example of the vinyl chloride resin (C) to be used in the step (I) includes a vinyl chloride resin powder for paste which has an average degree of polymerization ranging from 500° to 2,500° and an average size of from 0.05 to 50 microns.

As the polymerization initiator, there may be preferably employed a polymerization initiator in which the decomposition temperature necessary for obtaining a half-value period of 1 minute is higher than 150°C, or a mixture of at least 80% by weight of such polymerization initiator with other polymerization initiator in which the decomposition temperature necessary for obtaining a half-value period of 1 minute is not higher than 150°C.

The other embodiment of the process of this invention comprises (I') the step of heating at a temperature ranging from 80° to 160°C a liquid composition obtained by sufficiently agitating and blending a mixture comprising (A) 5 to 70% by weight of an unsaturated alkyd resin having an average degree of condensation of at least 4 and a number average molecular weight of at least 1,000, (B) 20 to 70% by weight of a reactive plasticizer or its mixture with a vinyl monomer, (C) 10 to 65% by weight of a vinyl chloride resin and (D) 0.2 to 3% by weight of a polymerization initiator, to such an extent that the composition is not completely cured and cooling the composition to obtain a non-tacky solid-like partially-cured composition of a suitable form and (II') the step of optionally heating the partially-cured composition at a temperature ranging from 120° to 180°C to complete the curing.

In this second embodiment, the same unsaturated alkyd resin (A), vinyl chloride resin (C) and polymerization initiator as exemplified in the step (I) of the first embodiment may also be used.

Examples of the vinyl monomer (B) to be used in the step (I') include styrene and its mixtures with other vinyl monomers.

As the reactive plasticizer (B) to be used in the step (I'), there may be exemplified compounds expressed by the following structural formula:

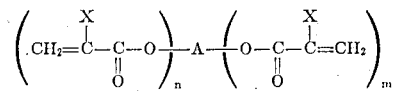

wherein A is a residue of a compound having at least two hydroxyl groups at the molecule ends or a compound having at least one ester or ether linkage in the molecule and at least two terminal hydroxyl groups; X stands for a hydrogen or halogen atom or an alkyl group having 1 to 2 carbon atoms; and n and m are selected from integers of 1 to 3.

DETAILED DESCRIPTION OF THE INVENTION

Figure 1:
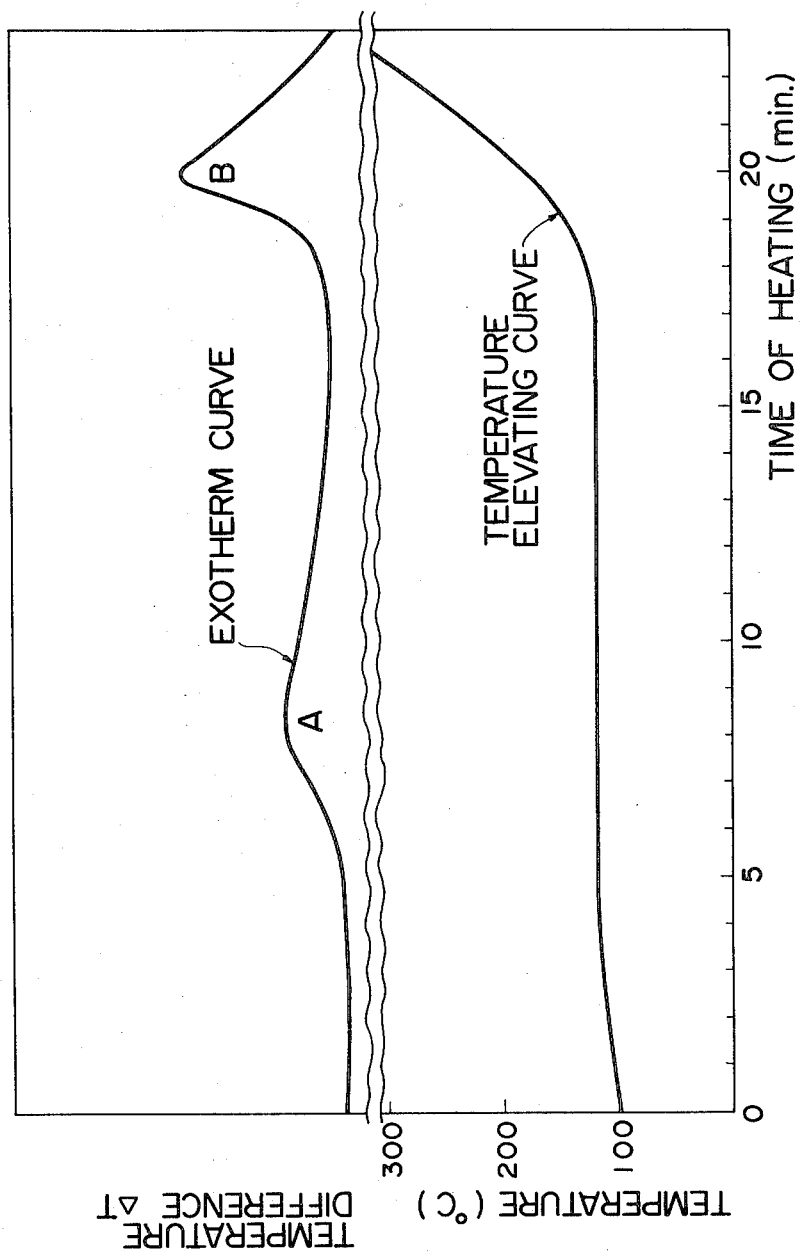
FIG. 1 illustrates an exotherm curve corresponding to the temperature-elevating curve obtained in the differential thermal analysis of the product of this invention.

In the process of this invention, a mixture comprising the following ingredients is at first formed:

A. 5 to 70% by weight of an unsaturated alkyd resin having an average degree of condensation of at least 4 and a number average molecular weight of at least 1,000, B. 20 to 70% by weight of a vinyl monomer, C. 10 to 65% by weight of a vinyl chloride resin, and D. 0.2 to 3% by weight of a polymerization initiator.

In the above recipe, the ingredient (B) may be replaced by (B') a reactive plasticizer or its mixture with a vinyl monomer.

As described above, this invention relates to improvements of the invention of the prior application (Ser. No. 138,316). In the invention of the prior application, use of a reactive plasticizer is an indispensable requirement, but in this invention use of a reactive plasticizer is not necessarily indispensable because an unsaturated alkyd resin is used and a specific molding method is adopted.

Unsaturated alkyd resins which are commercially available for formation of cast products, decorative plates, laminated plates, paints, etc. may be used as the unsaturated alkyd resin in this invention. Unsaturated alkyd resins are obtained by condensation of unsaturated polybasic acids with polyhydric alcohols, and in most commercially available products, part of the unsaturated polybasic acids are generally replaced by saturated fatty acids or aromatic polybasic acids.

Maleic anhydride, fumaric acid, itaconic acid and the like are used as the unsaturated polybasic acid, and phthalic anhydride, isophthalic acid, tetrahydrophthalic anhydride, adipic acid, tetrachlorophthalic anhydride, HET acid, terephthalic acid, sebacic acid, 3,6-endomethylene tetrahydrophthalic anhydride, maleic anhydride adduct of methyl cyclopentadiene, tetrabromophthalic anhydride, trimellitic anhydride, pyromellitic anhydride, hexachlorocyclopentadiene-tetrahydrophthalic anhydride and the like are used as the saturated polybasic acid.

As the polyhydric alcohol, there may be employed ethylene glycol, propylene glycol, diethylene glycol, dipropylene glycol, hydrogenated bisphenol, 1,5-pentane diol, 1,3-butane diol, 2,3-butane diol, 1,4-butane diol, 1,6-hexane diol, 2,2'-di(4-hydroxypropoxyphenyl)propane, neopentyl glycol, dibromoneopentyl glycol and the like.

In this invention, in order to obtain a liquid composition which has a low viscosity and is stable, it is especially preferable to employ an unsaturated alkyd resin formed by condensation of (i) 1 mole equivalent of a dicarboxylic acid component consisting of an unsaturated dibasic acid such as exemplified above or its mixture with a saturated aliphatic or aromatic dibasic acid such as exemplified above and (ii) 1 to 1.2 mole equivalents of a polyhydric alcohol component consisting of neopentyl glycol or 1,6-hexane diol alone or a mixture of at least 0.2 mole equivalent, especially at least 0.3 mole equivalent, of neopentyl glycol, 1,6-hexane diol or both with other polyhydric alcohol.

This unsaturated alkyd resin prevents increase of the viscosity in the starting liquid composition to be used in this invention and also prevents sedimentation or precipitation of particles of the vinyl chloride resin. Therefore, the pot life of the starting liquid composition can be prolonged by employing this unsaturated alkyd resin.

In this invention it is preferred that the unsaturated alkyd resin have an average degree of condensation of at least 4 and a number average molecular weight of at least 1,000. In case an unsaturated alkyd resin having a degree of condensation of less than 4 is used, tackiness is observed in the partially-cured composition and mechanical properties of the final cured composition are poor. Since the unsaturated alkyd resin specified in this invention exhibits activity toward reducing the tackiness in the partially-cured composition, it is possible to employ a great quantity of a vinyl monomer and increase the strength of the partially-cured composition. Therefore, the partially-cured composition can be formed into film without use of reinforcing agents such as glass fibers.

The unsaturated alkyd resin is used in an amount of 5 to 70% by weight. When the content of the unsaturated alkyd resin is below 5% by weight, improvements such as mentioned above are not attained, and at an unsaturated alkyd resin content exceeding 70% by weight, the viscosity of the starting liquid composition is increased and it loses practical value.

The vinyl chloride resin to be incorporated in the starting liquid composition used in this invention includes a homopolymer of vinyl chloride and a copolymer of vinyl chloride with other monomer copolymerizable therewith. Namely, it includes copolymers of vinyl chloride with vinyl acetate, vinyl propionate, methyl methacrylate, butyl acrylate, vinylidene chloride, acrylonitrile, vinyl ether, diethyl maleate, acrylic acid, methacrylic acid, maleic anhydride and the like. It further includes a saponified product of a copolymer of vinyl chloride with vinyl acetate.

In order to obtain a molded article or film having excellent physical properties, it is important that such homopolymer or copolymer of vinyl chloride should be highly polymerized, and it is generally preferable to use a homopolymer or copolymer of vinyl chloride having a degree of polymerization ranging from 500 to 2,500. Preferable average particle sizes of such vinyl chloride resin are from 0.05 to 50 microns, especially from 0.2 to 2 microns. It is best to use a homopolymer of vinyl chloride or a copolymer of vinyl chloride with vinyl acetate containing 95 – 99% by weight of vinyl chloride which has been prepared for plastisol. In order to obtain a plastisol of a low viscosity, it is possible to use as an extender a coarse vinyl chloride resin having a particle size of 5 – 100 microns in combination with such homopolymer or copolymer.

The vinyl chloride resin to be used in this invention adsorbs thereon the vinyl monomer, reactive plasticizer and unsaturated alkyd resin at high temperature to thereby increase the viscosity of the composition and exhibit an activity of controlling the polymerization rate, while hardly impairing the physical properties of the completely cured composition.

The vinyl chloride resin is incorporated in the starting composition to be used in this invention in an amount of 10 to 65% by weight. At a vinyl chloride resin content below the lower limit of 10% by weight, the abovementioned effects cannot be attained, and at a vinyl chloride resin content above the upper limit of 65% by weight, the viscosity of the starting liquid composition is increased and it cannot be applied to practical use.

The vinyl monomer referred to in this invention includes monomers having a double bond in the molecule. As such monomer, there may be exemplified styrene, chlorostyrene, tert-butylstyrene, vinyl toluene, divinyl benzene, vinyl acetate, methacrylates such as ethyl methacrylate, butyl methacrylate, 3-methoxybutyl methacrylate, cyclohexyl methacrylate, n-octyl methacrylate, 2-ethylhexyl methacrylate, lauryl methacrylate and glycidyl methacrylate, and acrylates such as methyl acrylate, ethyl acrylate, butyl acrylate, 3-methoxybutyl acrylate, cyclohexyl acrylate, n-octyl acrylate, 2-ethylhexyl acrylate, lauryl acrylate and glycidyl acrylate.

The vinyl monomer is incorporated in the starting liquid composition for the purposes of adjusting the viscosity of the composition and improving hardness, chemical resistance and mechanical properties of the resulting molded article.

The vinyl monomer dissolves therein the unsaturated alkyd resin and facilitates dispersion of vinyl chloride resin powder. Further, it copolymerizes with the unsaturated alkyd resin or reactive plasticizer to improve physical properties of the final cured product. The vinyl monomer generally has the property of being adsorbed on a vinyl chloride resin, and therefore, it exhibits a high reactivity at the second step of completing the curing while generating a large amount of polymerization heat, with the result that the complete curing of the composition can be accomplished at a relatively low temperature such as ranging from 120° to 180°C in this invention.

Among vinyl monomers exemplified above, styrene is most preferred.

When the component (B) of the composition to be used in this invention consists of a vinyl monomer alone, it is incorporated in an amount of 20 to 70% by weight. At a vinyl monomer content below 20% by weight, the starting liquid composition has too high a viscosity, and at a vinyl monomer content above 70% by weight, the reactivity is so high that the step of formation of the partially-cured composition includes operational difficulties, and the final cured product is brittle and of no practical value. For the same reasons, in the case of the component (B') comprising a vinyl monomer and a reactive plasticizer, the total amount of the component (B') should be within a range of from 20 to 70% by weight.

Also in case styrene alone is used as the vinyl monomer, it is used in an amount of 20 to 70% by weight. When a mixture of styrene with other vinyl monomer is used, it is preferred that the mixture comprises 20 to 95% by weight of styrene and 5 to 80% by weight of other vinyl monomer.

The reactive plasticizer to be incorporated in the starting liquid composition used in this invention is an acrylic acid ester plasticizer expressed by the general formula

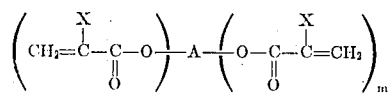

wherein A is a residue of a compound having at least two hydroxyl groups at the molecule ends or a compound having at least one ester or ether linkage in the molecule and and at least two terminal hydroxyl groups; X stands for a hydrogen or halogen atom or an alkyl group such as methyl and ethyl groups; and n and m are selected from integers of 1 to 3.

As such reactive plasticizer, there may be exemplified ethylene glycol dimethacrylate, propylene glycol dimethacrylate, 1,3-butanediol dimethacrylate, 1,4-butanediol dimethacrylate, 2,3-butanediol dimethacrylate, 2-ethyl-1,3-hexanediol dimethacrylate, 1,5-pentanediol dimethacrylate, 1,6-hexanediol dimethacrylate, neopentyl glycol dimethacrylate, glycerine trimethacrylate, dimethacryl (bis-diethyleneglycol) phthalate, dimethacryl (bis-diethyleneglycol) phthalate, dimethacryl (bis-diethyleneglycol) maleate, tetramethacryl (bis-glycerine) phthalate, triethylene glycol dimethacrylate, tetramethylene glycol dimethacrylate, polyethylene glycol dimethacrylate and trimethylolpropane trimethacrylate. In addition, there may be used allyl-type reactive plasticizers such as allyl acrylate, triallyl cyanurate, diallyl maleate, diallyl itaconate, diallyl sebacate, diallyl adipate, diallyl glycolate, triallyl aconitate, diallyl monooctyl phosphate, triallyl phosphate, diallyl isophthalate and diallylbenzene phosphate.

Still in addition, it is possible to use as the reactive plasticizer alkyl esters of α,β-unsaturated acids in which the alkyl radical has preferably 4 to 16 carbon atoms, such as dibutyl maleate, dicyclohexyl maleate, dioctyl maleate, dibutyl fumarate, dicyclohexyl fumarate, dioctyl fumarate, dibutyl itaconate, dioctyl itaconate, cyclohexyl acrylate, octyl acrylate, lauryl acrylate, cyclohexyl methacrylate, octyl methacrylate, and lauryl methacrylate.

These reactive plasticizers may be used singly or in the form of admixtures of two or more.

It has been found that these reactive plasticizers exhibit effects of increasing the compatibility between the vinyl chloride resin and the unsaturated alkyd resin and improving mechanical properties, the heat distortion temperature and the transparency of the final molded article.

In view of the curing rate, use of reactive plasticizers of the acrylic acid ester type is not preferred, because they exhibit the highest curing rate among reactive plasticizers exemplified above.

The reactive plasticizer may be used in combination with a vinyl monomer, and the reactive plasticizer combined with a vinyl monomer dissolves the unsaturated alkyd resin or disperses the vinyl chloride resin to form a plastisol. When the reactive plasticizer is incorporated, the liquid composition to be used in this invention comes to have a low viscosity and because of less change in the viscosity, the workability of the composition is greatly improved.

In case the reactive plasticizer is used alone, it is incorporated in an amount of 20 to 70% by weight, and when it is used in combination with a vinyl monomer, the total amount of the reactive plasticizer and vinyl monomer is within a range of from 20 to 70% by weight. It is preferred that the mixing ratio of the reactive plasticizer to the vinyl monomer be within a range of from 100/0 to 5/95.

In the starting liquid composition to be used in this invention, a polymerization initiator is incorporated in an amount of 0.2 to 3.0 % by weight. Organic peroxides of the high temperature decomposition type in which the decomposition temperature necessary for obtaining a half-value period of 1 minute is higher than 150°C are preferably used as the polymerization initiator in this invention. As such initiator, there may be exemplified methyl ethyl ketone (said decomposition temperature (abbreviated as "d.t." hereinbelow) being 171°C), cyclohexanone peroxide (d.t. = 174°C), tert-butyl hydroperoxide (d.t. = 179°C), p-(m-) menthane hydroperoxide (d.t. = 216°C), cumene hydroperoxide (d.t. = 255°C), 2,5-dimethylhexane 2,5-dihydroperoxide (d.t. = 257°C), tert-butyl perbenzoate (d.t. = 170°C), tert-butyl peracetate (d.t. = 160°C), di-tert-butyl peroxide (d.t. = 186°C), dicumyl peroxide (d.t. = 171°C), 2,5-dimethyl-2,5-di(tert-butylperoxy) hexane (d.t. = 179°C), 2,5-dimethylhexane 2,5-di(hydroperoxide) (d.t. = 257°C), diisopropyl benzene hydroperoxide (d.t. = 205°C), di-tert-butyl perphthalate (d.t. = 159°C), etc. These polymerization initiators may be used singly or in admixtures of two or more.

It is possible to employ a combination of an organic peroxide of the high temperature decomposition type such as exemplified above with a polymerization initiator of the low temperature decomposition type in which said decomposition temperature is not higher than 150°C. As such initiator of the low temperature decomposition type, there may be exemplified benzoyl peroxide (d.t. = 130°C), p-chlorobenzoyl peroxide (d.t. = 137°C), 2,4-dichlorobenzoyl peroxide (d.t. = 121°C), propionyl peroxide (d.t. = 118°C), lauroyl peroxide (d.t. = 114°C), acetyl peroxide (d.t. = 123°C), tert-butyl peroxyisobutylate (d.t. = 133°C), succinic acid peroxide (d.t. = 131°C), di-isopropyl peroxydicarbonate (d.t. = 88°C), $\alpha,\alpha'$-azobisisobutyronitrile (d.t. = 106°C), etc. It is preferred that such polymerization initiator of the low temperature decomposition type is used in an amount of up to 20% by weight based on the total amount of polymerization initiators used.

In addition, it is possible to incorporate an ordinary non-reactive plasticizer for vinyl chloride resins in an amount of up to 50% by weight, preferably up to 30% by weight, into the starting liquid composition to be used in this invention, Examples of such non-reactive plasticizer are phthalic acid esters such as dibutyl phthalate, diamyl phthalate, dimethoxyethyl phthalate, dibutoxyethyl phthalate, dicyclohexyl phthalate, dihexyl phthalate, butyloctyl phthalate, di-(n-octyl) phthalate, di-(2-ethylhexyl) phthalate, di-isooctyl phthalate, didecyl phthalate, didodecyl phthalate and butylbenzyl phthalate, phosphates such as alkyl diphenyl phosphate and tricresyl phosphate, and other non-reactive plasticizers such as dicapryl, didecyl and di-2-ethyl-hexyl esters of adipic acid, succinic acid, azelaic acid and sebacic acid. Still in addition, customary saturated polyestertype or epoxy-type plasticizers for vinyl chloride resin, and chlorinated paraffin may be used in combination with non-reactive plasticizers such as exemplified above. It is preferable to use a plasticizer which does not affect the fluidity or storage stability of the polyvinyl chloride plastisol. These non-reactive plasticizers may be used in the form of admixtures of two or more of them.

The non-reactive plasticizer is incorporated in the starting liquid composition to be used in this invention for adjusting the viscosity of the composition, controlling the exothermic reaction temperature at the time of curing and improving the flexibility of the resulting molded article.

The starting composition to be used in this invention may further comprise stabilizers, pigments, fillers, polymerization inhibitors, lubricants, viscosity-adjusting agents, reinforcing agents (glass fibers) and other additives according to need. For instance, in order to improve the surface characteristics of the final cured product, it is preferable to incorporate about 1 to about 5% by weight of a lubricant into the starting liquid composition. Stearic acid, zinc stearate, magnesium stearate, colloidal silica and n-butyl stearate are preferably used as the lubricant. The former four lubricants are powdery at room temperature, and therefore, it is not preferred that they are used in large amounts, because abrupt increase of the viscosity is brought about in the liquid composition by incorporation of large amounts of these lubricants. On the other hand, the last-mentioned lubricant is soluble in the liquid composition at room temperature, and has no bad influence on the viscosity and the viscosity stability of the starting liquid composition.

The starting liquid composition to be used in this invention is characterized by a low viscosity and less change of the viscosity during a extended storage, and it is stable for a long time. Accordingly, various additives can readily be dispersed into the composition, and in industrial applications, the composition to be used in this invention can be handled and treated as easily as ordinary unsaturated polyester resins. Therefore, before the liquid composition has been converted to the partially-cured state, it is possible to effect pretreatments by utilizing the flowability of the composition. This means that molded articles having various forms can be obtained and the range of application of the final molded products can be greatly expanded. For instance, partially-cured sheets formed by impregnating the composition into a glass cloth or mat are especially useful.

In conventional methods adopted for preparation of fiber glass reinforced plastics (FRP) by impregnating liquid thermosetting resins in glass cloths and mats, for instance, hand lay-up and spray-up methods, it is difficult to conduct automatic or continuous operation by mechanization, obtain products of uniform quality or to mass-produce products. However, in the case of impregnating a partially-cured composition of this invention into a glass cloth or mat, mechanization of production of FRP laminates is made possible by press molding of such partially-cured composition. Further, this invention is also advantageous in that a partially-cured composition formed from the starting liquid composition may be utilized after it has been powdered or pelletized.

For formation of the starting liquid composition to be used in this invention, for instance, the following methods may be adopted:

1. a method comprising dispersing a vinyl chloride resin powder into a solution of an unsaturated alkyd resin in a vinyl monomer, and adding a polymerization initiator to the resulting dispersion;
2. a method comprising dispersing a vinyl chloride resin powder in a solution of an unsaturated alkyd resin in a vinyl monomer and a reactive plasticizer, and adding a polymerization initiator to the resulting dispersion;
3. a method comprising mixing a solution of an unsaturated alkyd resin in a vinyl monomer with a plastisol formed by dispersing a vinyl chloride resin in a reactive plasticizer, and adding a polymerization initiator to the resulting mixture; and
4. a method comprising mixing a solution of an unsaturated alkyd resin in a vinyl monomer and a reactive plasticizer with a plastisol formed by dispersing a vinyl chloride resin in a reactive plasticizer, and adding a polymerization initiator to the resulting mixture.

In this invention, in order to obtain a liquid composition having a low viscosity, it is particularly preferred that at first a plastisol be formed by dispersing a vinyl chloride resin in a reactive plasticizer and the plastisol be then mixed with a solution of an unsaturated alkyd resin. A method comprising contacting a vinyl chloride resin directly with a vinyl monomer is not preferred, because the vinyl chloride resin is abruptly swollen and gelled.

In the molding process of this invention, the thus formed liquid composition comprising the above-mentioned ingredients at a ratio within the above-mentioned range is at first heated at a temperature ranging from 80° to 160°C to such an extent that the composition is not completely cured, and the composition is then cooled to obtain a non-tacky solid-like partially-cured composition of a suitable form.

The degree of "partially-cured" state referred to in this invention may be determined by the transparency and hardness of the partially-cured composition. As the curing reaction advances in the liquid composition of this invention, the total light transmission increases with decrease of the haze value. In the completely cured molded article, the total light transmission is 70 – 95% and the haze value is 5 – 20%. On the other hand, in the partially-cured composition, the total light transmission is 40 – 70% and the haze value is 50 – 95%. (In the instant specification, the values of the total light transmission and haze are those measured according to the method 6714 of Japanese Industrial Standard (JIS).)

In connection with the hardness, as the curing reaction advances in the liquid composition of this invention, the hardness increases. In the completely cured product, the Rockwell hardness (R) is about 90 to about 125 and the Barcol hardness is 60 to 75. On the other hand, the hardness of the partially-cured composition is within a range of 20 to 95 as measured by the spring-type hardness test method according to JIS K–6301 (physical test method of cured rubber). In case this value of the hardness is lower than 20, formation of the three-dimensional cross-linkage is insufficient and the composition is almost liquid. Therefore, handling of a composition of such low hardness causes difficulties. In case the partially-cured composition has a hardness above 95 as measured by the above test method, the plastic deformation of the composition is low and its molding cannot be accomplished conveniently. It is most preferred that the partially-cured composition have a hardness of 70 to 90 as measured by the above-mentioned test method. The composition having a hardness within such range takes, in short, a non-tacky solid form and has no liquid character. Therefore, it may be converted to a suitable form by cutting it into a suitable form or size, or bending it to have s suitable configuration.

It is considered that the "partially-cured" composition referred to in this invention has a loosely cross-linked, three-dimensional structure. Therefore, it has no flowability of itself but possesses a plastic deformability. Further, it can be kept in the stable state for a long time (usually for more than three months of at room temperature). It is also considered that in this invention, such loosely cross-linked, three-dimensional structure (partially-cured state) can be formed mainly by the unsaturated alkyd resin and vinyl monomer. On the other hand, in the process disclosed in the above-mentioned specification of U.S. Pat. No. 3,557,046, the solid-like state is attained mainly by swelling (gelation) of the vinyl chloride resin brought about by an action of the reactive plasticizer or vinyl monomer. Accordingly, in this invention, the first factor for preparing a solid-like composition resides in selection of the heating method and heating temperature appropriate for attaining a slow activation of the polymerization initiator and bringing about a partially-cured state in a desirable period of time, and the second factor resides in selection of the temperature which can promote the swelling of the vinyl chloride resin to some extent. On the other hand, in the process of said U.S. Patent, in order to attain the swelling of the vinyl chloride resin, the heating must be conducted at a sufficiently high temperature for a sufficient period of time, and the activation of the polymerization initiator is inhibited as much as possible during the step of swelling the finyl chloride resin. In short, the "partially-cured" state is attained in this invention and in the process of the above U.S. Patent the "swollen or gelled" state is attained, and the inventions are quite different from each other.

In the "partially-cured" state referred to in this invention, a structure which is cross-linked to some extent is present, and therefore, volatilization or bleeding of the vinyl monomer or reactive plasticizer is prevented to give a composition having a non-tacky surface and a good workability. Further, no precipitation occurs during storage.

In addition, the completely cured product (final product) of the composition of this invention is composed of the unsaturated alkyd resin skeleton, and its structure is quite different from the loosely three-dimensional structure of the product derived from a composition formed by adding a reactive plasticizer or a combination of a reactive plasticizer and a vinyl monomer to a vinyl chloride resin (namely, the product of said U.S. Patent). More specifically, hardness, heat distortion temperature, mechanical properties and chemical properties of the final cured product obtained in this invention are similar to those of unsaturated polyester resins, whereas these properties of the product obtained by the process taught in the specification of said U.S. Patent are similar to those of vinyl chloride plastisol molded articles.

As described above, the partially-cured composition of this invention has a loosely cross-linked, three-dimensional structure, and considerable double bonds which are reactive are present in the composition. These remaining double bonds can be confirmed and determined by absorption peaks appearing at the infrared absorption spectrum.

In order to explain the "partially-cured" state referred to in this invention in more detail, results of the differential analysis will now be shown by reference to accompanying drawings.

FIG. 1 is a thermogram of an example of a liquid composition of this invention, which is obtained in the following manner.

A test tube is charged with 110 mg of silica and 100 mg of a liquid composition A of this invention which will be described below, and the temperature is elevated. When the temperature reaches 120°C, the temperature elevation is stopped. As is seen from peak A shown in FIG. 1, at this point the exotherm is observed. This peak A indicates the "partially-cured" state. Then, the temperature elevation is continued and another exotherm is observed as indicated by peak B appearing at FIG. 1. This peak B indicates the exotherm caused by the polymerization reaction bringing about the complete curing of the composition.

Figure 2:
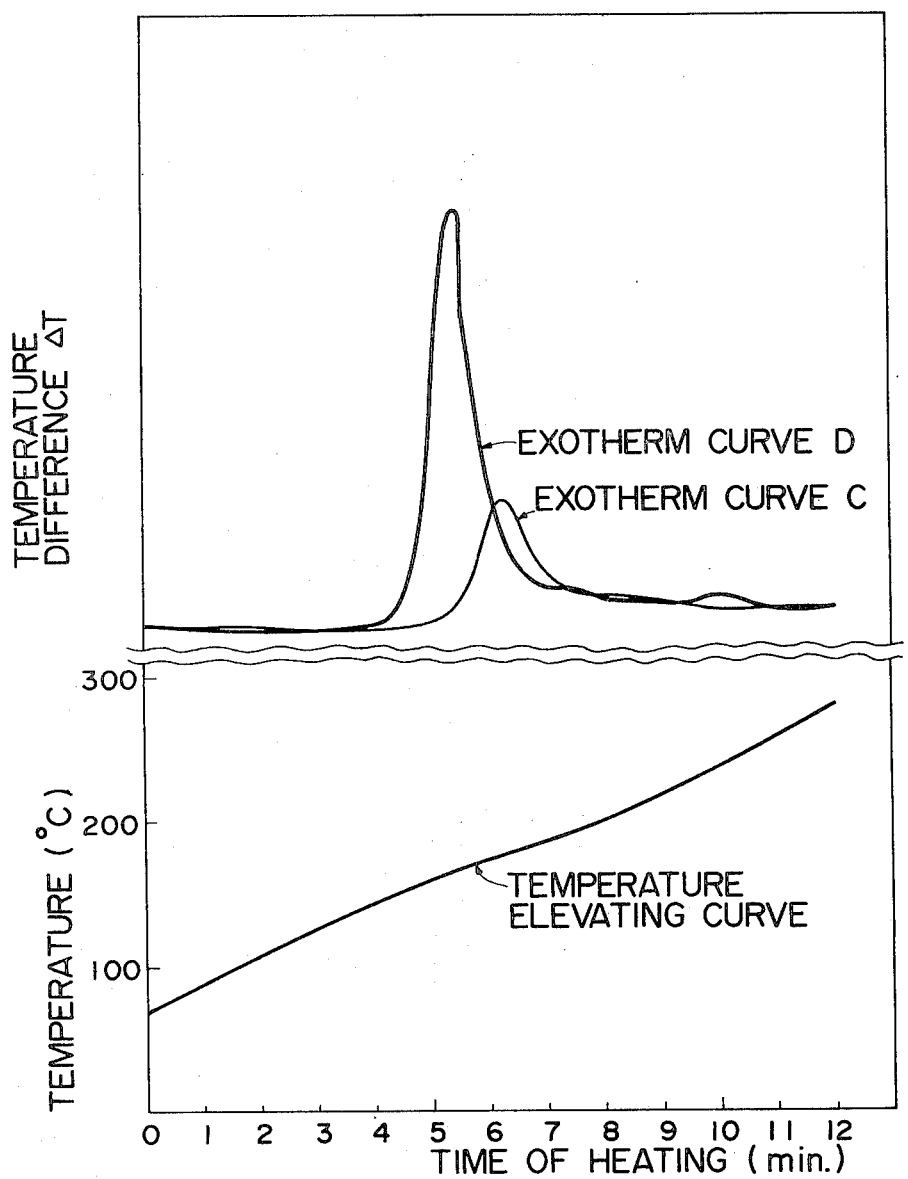
FIG. 2 illustrates exotherm curves corresponding to the temperature-elevating curves obtained in the differential thermal analysis of the product of this invention and the product obtained in the Comparative Example.

FIG. 2 illustrates results of the differential thermal analysis obtained when a liquid composition is once partially-cured and then it is heated (curve C; this invention) and also results of the differential analysis obtained when the same liquid composition is heated without conducting the partially-cured (curve D; comparison). In each case, the exotherm caused by the polymerization reaction is observed at temperatures between 150° and 200°C, but in the case of the partially-cured composition, each of the temperature difference ($\Delta T$) and the exotherm heat ($\Delta H$) is smaller.

Accordingly, the "partially-cured" state referred to in this invention is characterized by not only the hardness and transparency but also the ratio of the exotherm heat in the composition which has passed through the partially-cured state (curve C) to the exotherm heat in the composition which has not passed through the partially-cured state (curve D). More specifically, the said ratio of the heat generated at temperatures between 150° to 250°C expressed by the following formula:

Exotherm Heat Ratio = $\Delta H$ of composition having passed through partially-cured state/$\Delta H$ of composition not having passed through partially-cured state is within a range of from one-fourth to one-eighth.

Figure 3:
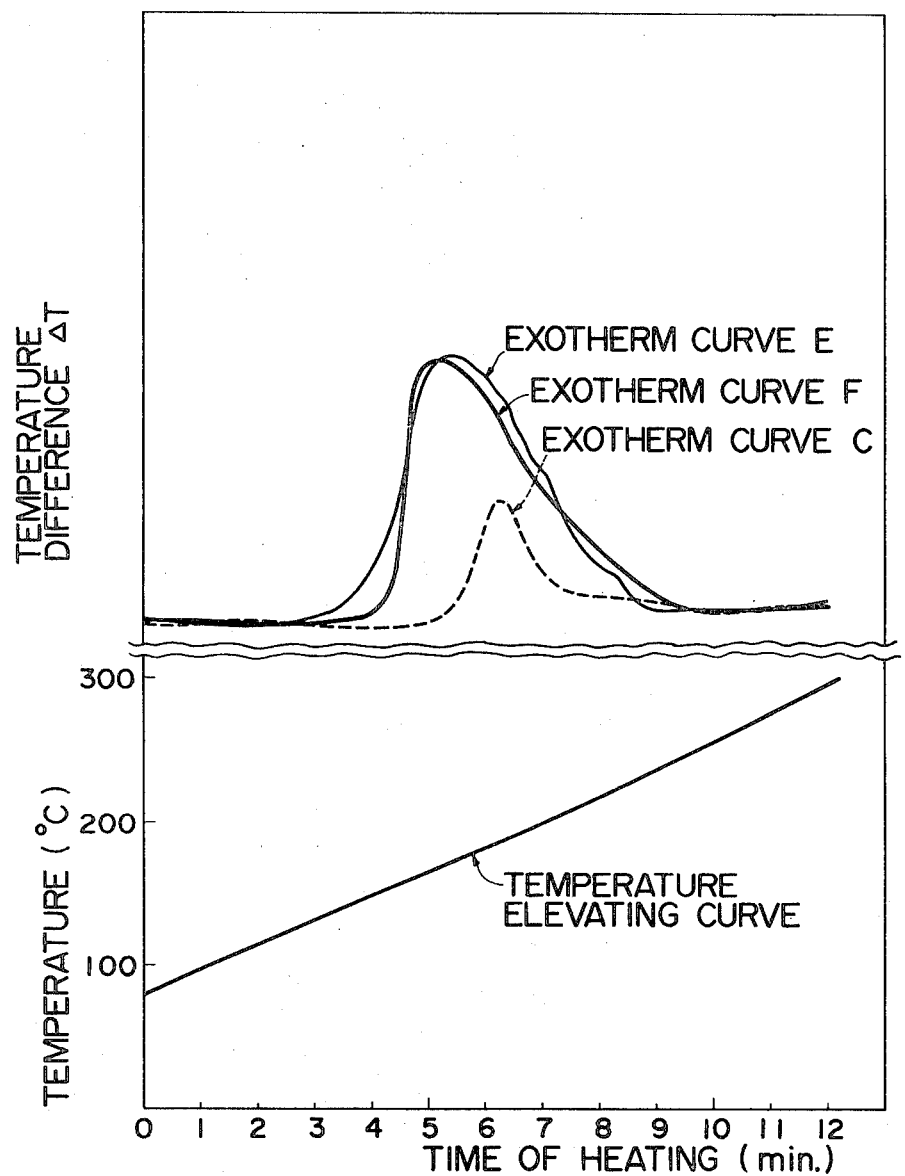
FIG. 3 illustrates exotherm curves corresponding to the temperature-elevating curves obtained in the differential thermal analysis of conventional compositions (for better illustration, the exotherm curve C of FIG. 2 is also given in FIG. 3).

FIG. 3 illustrates results of the differential thermal analysis of a liquid composition comprising a vinyl chloride resin and a reactive plasticizer, which has been known from the specification of U.S. Pat. No. 3,557,046 (exotherm curve E) and a partially-solid composition formed by semi-gelling the above liquid composition (exotherm curve F). As is seen from FIG. 3, whether this known composition is semi-gelled or not, similar exotherm curves are obtained. Accordingly, it will readily be understood that in known compositions disclosed in the above-mentioned U.S. Patent the "semi-gelled" state means nothing but a state in which vinyl chloride resin particles are swollen with the reactive plasticizer, and this swollen state is quite different from the "partially-cured" state (namely, the loosely cross-linked, three-dimensional state) referred to in this invention.

In this invention, when the above-explained liquid composition is prepared and it is heated at 80° to 160°C as it is or after it has been incorporated with additives according to need, adsorption of the vinyl monomer and reactive plasticizer on the vinyl chloride resin is at first caused to occur by conductive heat. At the next stage, the polymerization is initiated by radicals formed by decomposition of the polymerization initiator, and the free vinyl monomer, reactive plasticizer and unsaturated alkyd resin are adsorbed on the vinyl chloride resin having a higher molecular weight by conductive heat and polymerization heat. At the same time, the copolymerization results in formation of a loosely cross-linked, three-dimensional structure, whereby the viscosity of the composition increases abruptly and diffusion of the vinyl monomer, reactive plasticizer, polymer radicals and initiator radicals is inhibited to reduce the curing rate extremely. When the cooling is effected at this stage, namely before complete curing, the viscosity of the product is further heightened and the polymerization is stopped to obtain a non-tacky partially-cured composition free of the characteristic ordor of the vinyl monomer. When the thus formed partially-cured composition is heated at 120° – 180°C to complete the curing, a final molded article is obtained.

In this invention, since the partially-cured composition is formed prior to completion of the curing, the second heating step (final heating step) may be conducted at a relatively low temperature (120° – 180°C) and it can be accomplished in a short time. Furthermore, according to the process of this invention, the degree of polymerization may be controlled with ease.

In the final cured molded article of this invention, since it has passed through the intermediate partially-cured state, polymerization is eliminated to some extent during the final curing stage. Furthermore, the polyvinyl chloride resin is contained in the composition. Accordingly, the composition of this invention is advantageous over conventional unsaturated polyester resins in the point that the mold shrinkage is low and formation of warps or cracks in the resulting molded article is very rare. In short, the composition of this invention is superior to conventional unsaturated polyester resins in molding processability and properties of the resulting molded article.

As is seen from the foregoing description, the following three points must be taken into consideration in preparing a partially-cured composition from the starting liquid composition:

1. heating temperature and heating method;
2. stopping of the curing reaction; and
3. selection of the polymerization initiator.

These three points will now be explained in more detail.

1. Heating Temperature and Heating Method

When the composition has a form in which heat is readily accumulated, for instance, a form in which the temperature of the composition becomes higher than ambient temperature during the reaction, complete curing is attained because the reaction advances too rapidly. On the other hand, in case the composition has a form in which accumulated heat is allowed to escape readily, for instance, a sheet-like form, or in case a heating method giving a low thermal conductivity is adopted, the time required for complete curing is prolonged even at the same ambient temperature. Accordingly, the heating method and the form of the composition to be heated must be taken into consideration as the first condition for keeping the partially-cured state continuously.

2. Stopping of Curing Reaction

The composition which comes to have the partially-cured state is then cooled and the partially-cured state is maintained at room temperature. For attaining this, it is necessary to stop the curing reaction, which is the second condition to be taken into consideration. The cooling may be effected by a gradual cooling method, a rapid cooling method or other method, and an optional method can be appropriately chosen depending on the starting composition. The stopping of the reaction is considered to be due to the following mechanism.

The vinyl chloride resin, which is one of the components of the starting liquid composition to be used in this invention, is solvated with other components such as the vinyl monomer and/or reactive plasticizer at high temperature, and as a result, the vinyl chloride resin is swollen, with the consequence that the vinyl chloride resin adsorbs the vinyl monomer or reactive plasticizer and to retard the advance of the curing reaction and coincidentally prevent diffusion of polymerization radicals by increasing the viscosity of the composition. When the thus partially-cured composition is cooled, the viscosity is further heightened and at last the curing reaction is stopped.

As is seen from the above explanation, the reaction of converting the starting liquid composition to a partially-cured composition should be effected at a temperature sufficiend to make the vinyl chloride resin swollen with the vinyl monomer or reactive plasticizer. More specifically, the reaction should be effected at a temperature not lower than 80°C. This condition is, of course, related to the first condition mentioned above.

3. Selection of Polymerization Initiator

In addition to the first and second conditions, selection of the polymerization initiator should be taken into consideration in order to convert the starting liquid composition to be used in this invention into a solid-like composition. In case the curing reaction is carried out with use of a polymerization initiator of the low temperature decomposition type, for instance, benzoyl peroxide (in which the decomposition temperature necessary for obtaining a half-value period of 1 minute is 130°C), if the ambient temperature of the reaction system is 120°C, the reaction proceeds too rapidly and a stable partially-curing state cannot be maintained. On the other hand, if the curing is conducted at 60°C, the composition is completely cured without attainment of swelling of the vinyl chloride resin.

In case a polymerization initiator of the high temperature decomposition type, for instance, tert-butyl hydroperoxide (in which the decomposition temperature necessary for obtaining a half-value period of 1 minute is 179°C) is used and the ambient temperature is maintained at 120°C, although the time required for attaining the partially-cured state varies depending on the kind of the starting liquid composition and the heating method, the curing reaction can be stopped by cooling the composition after conducting the heating within a controllable period of time.

Preparation of the starting liquid composition to be used in this invention will now be illustrated by reference to some specific examples.

Preparation of Liquid Composition A

A first, isophthalic acid, maleic anhydride, propylene glycol and neopentyl glycol were reacted at a molar ratio of 1/1/1.1/1.1 to obtain an unsaturated alkyd resin having an acid value of 24, an average degree of polymerization of 13 and a number average molecular weight of 1330 (which will be referred to as "unsaturated alkyd resin No. 1" hereinbelow).

Separately, 62.5 parts by weight of a vinyl chloride resin for paste (vinyl chloride homopolymer having a degree of polymerization of 1,700), 37.5 parts by weight of trimethylol propane trimethyacrylate and 4.4 parts by weight of a composite stabilizer of the Zn/Cd/Ba type for vinyl chloride were charged into a mixer, and they were agitated and mixed for 20 minutes to disperse the vinyl chloride resin powder sufficiently, followed by defoaming. Into the resulting mixture was added 100 parts of a styrene solution of the above unsaturated alkyd resin (styrene content = 40% by weight), and the mixture was blended under agitation for 10 minutes to obtain a liquid composition A. When the viscosity of the liquid composition A was measured at 25°C, by a viscometer of the BH type (Rotor No. 4), it was found that the viscosity was 53 poises just after preparation, 110 poises one day after preparation, 116 poises 10 days after preparation and 121 poises 3 months after preparation. During the above period, no phase separation or sedimention was observed. This example illustrates a method of preparing a stable liquid composition by forming a vinyl chloride plastisol by utilizing the plasticizing effect of trimethylol propane trimethacrylate which is one of reactive plasticizers for vinyl chloride resins and incorporating in the resulting vinyl chloride plastisol an unsaturated alkyd resin which does not bring about an extreme increase of the viscosity of the vinyl chloride plastisol nor cause gelation of the plastisol.

Preparation of Liquid Composition B

In this example, the same unsaturated alkyd resin, vinyl chloride resin and stabilizer as used above for preparing the liquid composition A were employed.

In the same mixer as described above, 45.5 parts by weight of the vinyl chloride resin, 50 parts by weight of a styrene solution of the unsaturated alkyd resin (styrene content = 56.4% by weight) and 3.2 parts by weight of the stabilizer for vinyl chloride resins were mixed under agitation for 20 minutes to obtain a paste-like dispersion having a relatively high viscosity. This dispersion was incorporated with 50 parts by weight of the same styrene solution of the unsaturated alkyd resin as described above to obtain a liquid composition B, whose viscosity as measured at 25°C was 120 poises just after preparation, 121 poises 20 hours after preparation, 120 poises 100 hours after preparation and 115 poises 500 hours after preparation. However, slight precipitation (highly viscous layer) was observed at the bottom of the container after one month's storage. In case the unsaturated alkyd resin content was reduced below 30% by weight in the styrene solution of the unsaturated alkyd resin used in this example, the viscosity of the resulting liquid composition exceeded 1,000 poises, and especially when the unsaturated alkyd resin content was reduced below 10% by weight, a liquid composition having flowability could not be obtained. Further, when the whole of the styrene solution of the unsaturated alkyd resin used in this example was added at one time, the vinyl chloride resin particles agglomerated and uniform dispersion of the vinyl chloride resin particles could not be attained. For this reason, the styrene solution of the unsaturated alkyd resin was added half by half at two times in this example.

The above phenomena are related to the effect of swelling a vinyl chloride resin by styrene. As is well known in the art, when styrene alone is contacted with a vinyl chloride resin, it causes the swelling and gelation of the vinyl chloride resin. In other words, if a great quantity of styrene is contacted with a vinyl chloride resin, it is impossible to prevent the viscosity increase or gelation in the vinyl chloride resin. On the other hand, in case the contact between the vinyl chloride resin and styrene is conducted in the presence of an unsaturated alkyd resin, it is possible to disperse the vinyl chloride resin particles uniformly while preventing the swelling of the vinyl chloride resin. Namely, when the styrene solution of the unsaturated alkyd resin is added half by half in a divided manner such as described above, the viscosity is increased to some extent at the first stage but the vinyl chloride resin can be dispersed uniformly. And, the viscosity is reduced at the second stage by addition of the remaining half of the unsaturated alkyd resin solution, whereby formation of irregular agglomerates of the vinyl chloride resin particles can be prevented.

Preparation of Liquid Composition C

In the same mixer as described above, 100 parts by weight of an unsaturated alkyd resin solution comprising 43.6% by weight of the unsaturated alkyd resin No. 1, 29.1% by weight of styrene, 18.2% by weight of methyl methacrylate and 9.1% by weight of dibutyl fumarate was blended and agitated with 45.5 parts of the same vinyl chloride resin as described above and 3.2 parts of the same stabilizer as described above. The blending under agitation was continued for 20 minutes to obtain a liquid composition C, whose viscosity as measured at 25°C was 115 poises just after preparation, 115 poises 20 hours after preparation, 116 poises 100 hours after preparation and 110 poises 500 hours after preparation. No precipitation was observed at the bottom of a container even after one month's storage. Although in this example dibutyl fumarate was used in the form of being contained in the unsaturated alkyd resin solution, even if dibutyl fumarate is employed singly, it acts as a reactive plasticizer and makes it possible to disperse the vinyl chloride resin particles uniformly. In the unsaturated alkyd resin used in this example, if contents of the unsaturated alkyd resin and styrene are fixed, it is preferable to use methyl methacrylate and dibutyl fumarate at a ratio which will impart a low viscosity to the resulting liquid composition. Best results were obtained when the methyl methacrylate/dibutyl fumarate weight ratio was adjusted to about 2/1.

Comparative Example 1

Each of liquid compositions A, B and C and a styrene solution of an unsaturated alkyd resin, which was prepared in the same manner as adopted for preparing the styrene solution of the unsaturated alkyd resin used for formation of the liquid composition A (referred to as "comparative composition No. 1"), was incorporated with 1% by weight of tert-butyl hydroperoxide. The high temperature curing characteristics were determined by the method of JIS K-6901 with respect to each composition. The temperature of a thermostat tank used in the test was maintained at 120°C. Results are shown in Table 1.

Table 1

|  | Minimum Curing Time (minutes) | Maximum Exotherm Temperature (°C) |
|---|---|---|
| Liquid Composition A | 11.3 | 202 |
| Liquid Composition B | 16.1 | 163 |
| Liquid Composition C | 22.2 | 140 |
| Comparative Composition No. 1 | 6.0 | 250 |

Comparative Example 2

A mixture comprising 40 parts by weight of 1,3-butylene glycol dimethacrylate, 30 parts by weight of a vinyl chloride resin (coarsely divided particle), 30 parts by weight of another vinyl chloride resin (finely divided particles) and 0.3 part by weight of tert-butyl perbenzoate was subjected to the de-aeration treatment under reduced pressure to obtain a liquid composition (referred to as "comparative composition No. 2")

This liquid composition was heated for 1 minute at a mold temperature of 115°C by means of a hot press, and then it was cooled to room temperature rapidly to obtain a semi-gelled composition having a sheet-like form of a thickness of 1.5 mm. This semi-gelled composition was light and flexible but it was semi-transparent and its strength was not very high.

Liquid compositions A, B and C and comparative composition No. 1 were separately cast between two glass sheets (having a dimension of 20 cm × 20 cm) so that the thickness of the composition cast between the glass sheets was 3.0 mm. Then, the curing was effected for 120 minutes in a hot air-drying furnace maintained at 120°C. Then, each composition was taken from the furnace and cooled to room temperature. Comparative liquid composition No. 2 was similarly cast between two glass sheets, and heated at 150°C for 30 minutes in a hot air-drying furnace, following which it was cooled to room temperature. Physical properties of the thus formed molded sheets are shown in Table 2.

Table 2

| Properties of Molded Sheets | Liquid Composition A | Liquid Composition B | Liquid Composition C | Comparative Composition No. 1 | Comparative Composition No. 2 | Measurement Method |
|---|---|---|---|---|---|---|
| Tensile modulus (kg/mm$^2$) | 287 | 327 | 335 | 359 | 325 | JIS K-6919 |
| Tensile strength (kg/mm$^2$) | 6.01 | 3.19 | 5.86 | 3.14 | 6.33 | JIS K-6919 |
| Tensile elongation (%) | 4.79 | 2.33 | 4.61 | 2.11 | 4.59 | JIS K-6919 |
| Flexural modulus (kg/mm$^2$) | 349 | 330 | 297 | 361 | 199 | JIS K-6919 |
| Flexural strength (kg/mm$^2$) | 12.2 | 5.01 | 10.3 | 12.6 | 4.66 | JIS K-6919 |
| Rockwell hardness (R) | 125.0 | 122.9 | 122.4 | 126.5 | 102.6 | ASTM D-785 |
| Izod impact strength (with notches) (kg.cm/cm$^2$) | 1.18 | 1.29 | 1.71 | 1.57 | 0.23 | JIS K-6911 |
| Heat distortion temperature (°C.) | 99.7 | 103.6 | 95.0 | 114.2 | 72.0 | JIS K-6911 |
| Total light transmission(%) | 86.5 | 75.0 | 85.0 | 87.7 | 81.7 | JIS K-6714 |
| Haze value (%) | 10.2 | 15.1 | 14.9 | 7.15 | 16.0 | JIS K-6714 |

From the results shown in Table 2, it is seen that physical properties of cured compositions formed from liquid compositions A, B and C according to this invention are not degraded as compared with those of the cured product of the unsaturated alkyd resin. On the other hand, the cured product of the comparative composition No. 2 is extremely inferior to cured products of the liquid compositions of this invention and the unsaturated alkyd resin with respect to the hardness and the heat distortion temperature, and the flexural strength, flexural modulus and impact strength of the cured product of the comparative composition No. 2 are poor.

Preparation of Liquid Composition D, E, F, G and H

Unsaturated alkyd resins Nos. 2 to 6 were prepared from dibasic acids and polyhydric alcohols indicated in Table 3 according to customary procedures.

These unsaturated alkyd resins were dissolved in vinyl monomers and/or reactive plasticizers indicated in Table 4, and then, liquid compositions, D, E, F, G and H were prepared according to a method such as described above.

The viscosity and curing characteristics of these liquid compositions are also shown in Table 4.

Table 3

| Unsaturated Alkyd Resin Number | Composition (mole ratio) Dibasic Acid | Polyhydric Alcohol | Acid Value | Number Average Molecular Weight | Average Degree of Condensation |
|---|---|---|---|---|---|
| 2 | PA/MA=1/1 | HD = 2.2 | 17 | 1370 | 12 |
| 3 | IPA/MA=1/1 | NPG/DEG=1.1/1.1 | 25 | 2460 | 23 |
| 4 | PA/MA=1/1 | NPG/EG=0.7/0.4 | 20 | 1160 | 13 |
| 5 | IPA/MA=1/1 | HD/NPG=1.1/1.1 | 28 | 2000 | 18 |
| 6 | IPA/MA=1/1 | NPG/PG/DEG=0.97/1.08/0.11 | 29 | 1460 | 15 |

Abbreviations in Table 3 have the following meanings:
PA: phthalic anhydride
IPA: isophthalic acid
MA: maleic anhydride
HD: 1,6-hexanediol
NPG: neopentyl glycol
DEG: diethylene glycol
EG: ethylene glycol
PG: propylene glycol

Table 4

| Recipe (parts by weight) | D | E | Liquid Compositions F | G | H |
|---|---|---|---|---|---|
| unsaturated alkyd resin No. 2 | 60 | | | | |
| unsaturated alkyd resin No. 3 | | 60 | | | |
| unsaturated alkyd resin No. 4 | | | 60 | | |
| unsaturated alkyd resin No. 5 | | | | 60 | |
| unsaturated alkyd resin No. 6 | | | | | 60 |
| styrene | 40 | 40 | 30 | 40 | 20 |
| methyl methacrylate | | 20 | | | 20 |
| acrylonitrile | 40 | | | | |
| 2-ethylhexyl methacrylate | | | 17.5 | | |
| 2-ethylhexyl acrylate | | 40 | | | |
| vinyl chloride resin for paste (polymerization degree = 2300) | 60 | | 50 | 60 | |
| vinyl chloride resin for paste (polymerization degree = 900) | | 100 | | | 40 |
| diethylene glycol dimethacrylate | | | 12.5 | | |
| dibutyl fumarate | | | | 40 | |
| dibutyl phthalate | | | | | 30 |
| liquid composite stabilizer of Zn/Cd/Ba type | 4 | 7 | 3.5 | 4 | 3 |
| Viscosity (poise) | | | | | |
| just after preparation | 2100 | 1280 | 132 | 150 | 97 |
| 20 hours after preparation | 2300 | 1310 | 142 | 160 | 103 |
| 100 hours after preparation | 2300 | 1310 | 145 | 193 | 143 |
| 500 hours after preparation | 2300 | 1320 | 145 | 195 | 155 |
| Curing Characters | | | | | |
| minimum curing time (min.) | 22.8 | 24.7 | 21.8 | 22.7 | 23.5 |
| maximum exotherm temperature (°C.) | 128 | 121 | 138 | 129 | 119 |

This invention will now be described in more detail by reference to Examples.

Example 1

A. Preparation of Partially-Cured Composition:

Liquid composition A was incorporated with 1% by weight of tert-butyl hydroperoxide, and it was cast between two glass sheets (20 cm × 20 cm) so that the thickness of the composition cast between the two glass sheets was 3.0 mm. Then, the composition was put into a hot air-drying furnace maintained at 120°C while the heating time was varied as 10 minutes, 20 minutes, 25 minutes, 30 minutes, 45 minutes, 60 minutes, 2 hours, 2.5 hours or 4 hours to examine the change of the cured state brought about by advance of the curing reaction. The composition heated for 10 minutes took a liquid form, and compositions heated for 20 minutes and 25 minutes, respectively, were in the solid-like state (the partially-cured state referred to in this invention). Compositions heated for 30 to 60 minutes took a solid form in which the complete curing had not been attained. Compositions heated for 2 hours or longer were completely cured products. The total light transmission and haze value of the partially-cured compositions were determined according to the method of JIS K-6714, and also the hardness of these partially-cured compositions was determined according to the method of JIS K-6301 using a spring-type hardness tester. Results are shown in Table 5.

Table 5

| Heating time | 20 minutes | 25 minutes |
|---|---|---|
| Total light transmission | 48.3% | 55.8% |
| Haze value | 92.2% | 88.7% |
| Hardness | 78 | 85 |
| Exotherm heat ratio | 0.190 | 0.175 |

Flexural modulus, flexural strength, Rockwell hardness, total light transmission and haze value of compositions heated for 30 minutes or longer are shown in Table 6.

In Table 6, parenthesized values in the line of "flexural strength" are not the values of the strength at break but the values of the yield strength. This is due to the fact that samples were not broken at the flexural test while causing creep.

From the results shown in Tables 5 and 6, it is seen that the partially-cured state can be obtained in a heating time of 10 to 30 minutes, preferably 20 to 25 minutes in the method disclosed in this Example.

As is illustrated in this Example, the partially-cured composition of this invention can be obtained by conducting the heating for a controlled period of time, and this partially-cured state is characterized mainly by the total light transmission, haze value and hardness. When the heating is effected for a time close to the lower limit of the range of the heating time, the surface of the resulting partially-cured composition is slightly tacky, but as the heating time approaches the upper limit, the tackiness disappears and no tackiness is observed in the partially-cured composition which has been heated for a time almost equal to the upper limit. Unpolymerized styrene in the partially-cured composition is quite stable and has no tendency to volatilize. Accordingly, the resulting partially-cured composition has characteristic odor styrene. The partially-cured compositions obtained in this Example had only the characteristic odor of the active tert-butyl hydroperoxide. The partially-cured composition which was obtained in this Example by conducting the heating for 25 minutes will be referred to as "partially-cured composition X" hereinbelow.

B. Preparation of Completely Cured Product:

The partially-cured composition was further heated at 120°C for 4 hours in the same manner as described above. As is seen from the results shown in Table 6, the resulting completely cured product (Sample No. 7) had physical properties comparable to those of the completely cured product (Sample No. 6) obtained by conducting the heating continuously without interruption of the heating or intermediate cooling.

The gelled product formed from the comparative composition No. 2 obtained in Comparative Example 2 was further heated at 120°C for 240 minutes, but the resulting product was opaque and physical properties thereof were not improved. When the heating was conducted at 150°C for 30 minutes, the properties of the product were similar to those shown in Table 2, but this product was inferior to the completely cured product of the partially-cured composition X with respect to the hardness, the heat distortion temperature and other properties.

Example 2

A sample of 15 cm × 15 cm was cut from the partially-cured composition X having a sheet form of a thickness of 3.0 mm, and a molded article of an ash tray-like form of a depth of 3 cm was prepared from the sheet by employing a press of 50 tons. It was seen that a molding pressure of about 5 kg/cm$^2$ was sufficient in the projection face of the mold cavity when the heating was effected at 150°C for 3 minutes. Namely, the molding was accomplished basically by plastic deformation, and it differs from the molding accomplished by filling of the flowing resin in a mold. Therefore, a high pressure such as required for molding of SMC need not be adopted for molding the partially-cured composition of this invention, and molding machines can be effectively used in this invention. However, in the case of the above-mentioned partially-cured composition having a sheet-like form, since the press molding is accomplished by plastic deformation, unlike the flow molding, it is not suitable for forming a molded article of a complicated configuration. However, the press molding of the partially-cured composition x is most suitable for obtaining a molded article of a large size having less concavities or convexities. The ash tray-like molded article obtained above was characterized by a flexural modulus of 340 kg/mm$^2$, a flexural strength of 11.5 kg/mm$^2$ and a value of Rcokwell hardness (R) of 124.3 Even after the partially-cured composition had been allowed to stand for 4 months after preparation, the molding could be accomplished under the same temperature, pressure and heating time conditions as above to obtain a molded article having the same properties.

Example 3

The partially-cured composition X was finely divided by means of a turbo-mill, and 100 parts by weight of particles passing through a 100 mesh sieve were incorporated with 30 parts by weight of calcium carbonate and 20 parts by weight of glass fibers (one-quarter foot chopped strands) and they were well blended. Then, the blend was charged in a mold cavity used in Example 2 for preparation of ash trays, and the molding was conducted at 150°C under a pressure of 30 kg/cm$^2$ for 3 minutes to obtain a molded article. The reason why the molding pressure was different from that adopted in Example 2 is that particles of the partially-cured composition X were allowed to have closer contact with each other by adopting a higher temperature, whereby melt adhesion of the particles by the heating and subsequent bonding by the curing reaction could be promoted.

Example 4

The starting liquid composition to be used in this invention has such a low viscosity that it can be impregnated into a glass cloth or glass mat by a method such as the hand lay-up molding method adopted for forming fiber glass reinforced plastics (FRP). Therefore, it is possible to prepare a partially-cured composition comprising a glass substance by impregnating the starting liquid composition into the glass substance and converting it to the partially-cured state.

Table 6

| Sample No. | 1 | 2 | 3 | 4 | 5 | 6 | 7 |
|---|---|---|---|---|---|---|---|
| Heating time (min.) | 30 | 45 | 60 | 120 | 150 | 240 | 240 |
| Flexural modulus (kg/mm$^2$) | 6.80 | 219 | 213 | 336 | 349 | 310 | 318 |
| Flexural strength (kg/mm$^2$) | (0.383) | (7.11) | (7.99) | 12.2 | 12.2 | 12.1 | 12.3 |
| Rockwell hardness (M) | 42.0 | 56.5 | 72.3 | 96.0 | 94.4 | 98.7 | 98.3 |
| Total light transmission (%) | 72.5 | 80.0 | 84.2 | 86.5 | 87.2 | 86.9 | 86.5 |
| Haze value (%) | 63.0 | 45.3 | 21.3 | 10.2 | 11.3 | 10.0 | 12.1 |

A liquid composition A-1 comprising 100 parts by weight of the above-mentioned liquid composition A, 2 parts by weight of n-butyl stearate, 5 parts by weight of a toner for yellow coloration, 1 part by weight of p-(m-)menthane hydroperoxide and 0.2 part of benzoyl peroxide was impregnated into a plain glass cloth (product sold under the tradename "MG 252" by Asahi Glass Fiber Co., Ltd.) using an impregnation roll for the hand lay-up molding so that the glass content was 50% by weight. Then, the glass cloth was inserted between two polypropylene stretched films having a thickness of 5 μ to protect the glass cloth, and it was then heated at 120°C for 20 minutes in a hot air-drying furnace, following which the glass cloth was taken from the furnace and allowed to stand still at room temperature. Thus, a sheet-like partially-cured composition was obtained. Suitable heating periods were 15 - 25 minutes at a heating temperature of 120°C, 7 - 10 minutes at a heating temperature of 130°C and 4 - 5 minutes at a heating temperature of 140°C. The cooling was accomplished sufficiently only by taking out the sample from the furnace and allowing it to stand at room temperature. In this Example, when cellophane was used as a protective film in preparation of the partially-cured composition, the partially-cured state was attained in 6 - 7 minutes if the heating temperature was 120°C. However, in this case, the degree of the reaction advance was not uniform and the partially-cured composition was heterogeneous with respect to the hardness, which seems to be due to the physical properties, e.g., oxygen permeability, of cellophane. The protective film may be peeled off just after the cooling. The sheet-like partially-cured composition prepared in this Example will be referred to as "sheet-like partially-cured product Y" hereinbelow. The partially-cured product Y had a thickness of about 0.25 mm.

In case the starting liquid composition is impregnated in a glass cloth base or the like, fillers such as calcium carbonate, clay, aluminum hydroxide and antimony trioxide may be added to the composition according to need. An example of such composition is as follows:

| | |
|---|---|
| Liquid composition A | 100 parts by weight |
| Styrene | 10 parts by weight |
| Calcium carbonate | 30 parts by weight |
| Colloidal silica | 2 parts by weight |
| Dicumyl peroxide | 1.5 parts by weight |

Example 5

A glass cloth laminate having a thickness of 3 mm was prepared by overlapping 12 samples of the sheet-like partially-cured composition Y and conducting the molding operation at 150°C for 3 minutes under a pressure of 3 kg/cm² by employing a hand press. Although the molding pressure as low, a sufficient bonding was obtained between all adjacent sheets. The resulting laminate was characterized by a flexural strength of 21.0 kg/mm², a flexural modulus of 2,000 kg/mm² and a Barcol hardness of 55.

A laminate was prepared by inserting one metal wire between samples of the sheet-like partially-cured composition Y and conducting the molding operation similarly. The metal wire was completely embedded in the resulting laminate. This molding method is effective for improving the mechanical strength of the resulting FRP laminate and scattering can be effectively prevented when the laminate is broken.

Example 6

The liquid composition-impregnated glass cloth covered with protective film, which was prepared in Example 4, was heated directly by a hand press to obtain a partially-cured composition. In this method, it was preferable to conduct the heating for 2 - 3 minutes at a hot plate temperature of 120°C. In case sheet-like partially-cured compositions were prepared in the same manner by using liquid compositions B and C, it was suitable to conduct the heating for 1 - 2 minutes at a hot plate temperature of 120°C or for 2 - 3 minutes at a hot plate temperature of 110°C. In each case, a sheet-like partially-cured composition of good properties was obtained.

Example 7

This Example illustrates the molding of the sheet-like partially-cured composition Y.

More particularly, it relates to the preparation of a molded article having a form of a hemisphere having an inner diameter of 177 mm, an outer diameter of 180 mm, a thickness of 3 mm and a height of 90 mm using a 50-ton press provided with a mold for formation of a molded article of such configuration. A male mold of the above hemisphere-molding mold was attached to the lowr plate of the press, and 12 samples of 20 cm × 20 cm of the sheet-like partially-cured composition Y were placed on the drape in the overlapped state. When the molding was conducted at a mold temperature of 150°C under a pressure of 5 kg/cm² for 3 minutes, a molded structure having the above-mentioned hemispherical configuration was obtained. Thus, it was confirmed that the sheet-like partially-cured composition Y could be conveniently molded into a product having a three-dimensional curved surface. In the case of a channel-like molded article having a two-dimensional section, it was confirmed that it was possible to obtain a minimum R of 3 mm (inside). In preparing these molded articles, the glass cloth base was not broken.

Example 8

The above-mentioned liquid compositions D, E, F, G and H was molded under partially-cured conditions indicated in Table 7 by employing a hot air-drying furnace the same as used in Example 1. The final curing was carried out according to the method described in Example 2 by use of a mold and a 50-ton press. Molding conditions are also shown in Table 7. Properties of the resulting molded articles were determined to obtain the results shown in Table 7.

Table 7

| | Liquid Composition | | | | |
|---|---|---|---|---|---|
| | D | E | F | G | H |
| Amount (parts by weight) | 100 | 100 | 100 | 100 | 100 |
| Polymerization initiator (parts by weight) | | | | | |

Table 7 — Continued

|  | D | E | Liquid Composition F | G | H |
|---|---|---|---|---|---|
| tert-butyl hydroperoxide | 1 | 1 | 1 |  |  |
| p-(m-)methane hydroperoxide |  |  |  | 0.9 | 0.9 |
| benzoyl peroxide |  |  |  | 0.1 | 0.1 |
| Partially-cured Conditions |  |  |  |  |  |
| heating temperature (°C) | 120 | 120 | 120 | 120 | 130 |
| heating time (min.) | 20 | 25 | 20 | 30 | 25 |
| Properties of Partially-cured Composition |  |  |  |  |  |
| tackiness | no | no | no | no | no |
| exotherm heat ratio | 0.205 | 0.180 | 0.185 | 0.105 | 0.165 |
| hardness measured by spring test method | 55.4 | 46.3 | 63.2 | 71.5 | 31.6 |
| total light transmission (%) | 47.1 | 51.3 | 62.6 | 45.3 | 63.3 |
| haze value (%) | 78.3 | 86.5 | 94.5 | 72.3 | 93.2 |
| Molding Conditions |  |  |  |  |  |
| heating temperature (°C) | 150 | 150 | 150 | 150 | 160 |
| pressure (kg/cm$^2$) | 5 | 5 | 5 | 5 | 5 |
| molding time (min.) | 3 | 3 | 3 | 3 | 3 |
| Properties of Cured Composition |  |  |  |  |  |
| flexural modulus (kg/mm$^2$) | 357 | 155 | 250 | 135 | 312 |
| flexural strength (kg/mm$^2$) | 12.1 | 4.3 | 7.5 | 3.8 | 10.3 |
| Rockwell hardness (R) | 124.2 | 110.3 | 115.5 | 102.0 | 116.3 |
| total light transmission (%) | 75.6 | 82.5 | 83.6 | 84.0 | 73.3 |
| haze value (%) | 40.0 | 13.6 | 14.5 | 15.8 | 21.0 |

Example 9

An unsaturated alkyd resin solution was prepared by adding 40 parts by weight of styrene to 60 parts by weight of an unsaturated alkyd resin formed from components indicated in Table 8. Then, 100 parts by weight of a vinyl chloride homopolymer for paste having a degree of polymerization of 1650 was dispersed in 160 parts of the above unsaturated alkyd resin solution, following which 5 parts by weight of an organotin-type stabilizer for vinyl chloride resins, 3.6 parts by weight of tert-butyl hydroperoxide and 60 parts by weight of styrene monomer were added to the dispersion to obtain a liquid composition.

The change of the viscosity during the lapse of time was examined with respect to each of liquid compositions prepared in the above manner while measuring the apparent viscosity at 25°C at prescribed intervals by employing a rotary viscometer of the BH-type (Rotor No. 5).

The results are shown in Table 9, which also shows data on the thixotropy index expressed in terms of the ratio of apparent viscosity as measured at 4 rpm to apparent viscosity measured at 20 rpm.

Table 8

| | Synthesis of Alkyd Resin | | Composition and Properties of Unsaturated Alkyd Resins | | |
|---|---|---|---|---|---|
| | | | Properties of Unsaturated Alkyd Resin | | |
| Unsaturated Alkyd Resin Number | Composition (molar ratio of components charged) | Excessive ratio of glycol component (%) | Final acid value | Number average molecular weight | Average degree of condensation |
| 7 | PA/MA = 1/1<br>NPG = 2.16 | 8 | 24 | 1230 | 12 |
| 8 | PA/MA = 1/1<br>HD = 2.2 | 10 | 17 | 1370 | 12 |
| 9 | IPA/MA = 1/1<br>NPG = 2.16 | 8 | 25 | 1400 | 13 |
| 10 | AD/MA = 1/1<br>PG/NPG=1.08/1.08 | 8 | 17 | 2340 | 19 |
| 11 | IPA/MA = 1/1<br>PG/NPG=1.53/0.63 | 8 | 28 | 1720 | 18 |
| 12 | IPA/MA = 1/1<br>PG/NPG = 1.08/1.08 | 8 | 20 | 2190 | 22 |
| 13 | IPA/MA = 1/1<br>PG/HD = 1.08/1.08 | 8 | 28 | 1980 | 20 |

Abbreviations used in Table 8 have the following meanings:
PA: phthalic anhydride
IPA: isophthalic acid
AD: adipic acid
MA: maleic anhydride
PG: propylene glycol
NPA: neopentyl glycol
HD: 1,6-hexanediol

Table 9

Flow Characteristics of Liquid Compositions and Viscosity Change During Lapse of Time

| Liquid Composition | Number of Unsaturated Alkyd Resin Used | 5 hours after preparation | 1 day after preparation | 3 days after preparation | 5 days after preparation | 11 days after preparation | 25 days after preparation | Thixotropy Index (5 days after preparation |
|---|---|---|---|---|---|---|---|---|
| I | 7  | 26.8  | 28.9  | 30.9  | 31.6  | 35.1  | 34.8  | 1.01 |
| J | 8  | 25.4  | 29.7  | 32.4  | 33.8  | 37.7  | 39.8  | 1.00 |
| K | 9  | 32.5  | 44.5  | 48.1  | 48.1  | 49.0  | 49.3  | 1.03 |
| L | 10 | 19.3  | 21.0  | 21.1  | 21.2  | 21.2  | 21.2  | 1.03 |
| M | 11 | 303.2 | 315.0 | 321.4 | 329.0 | 341.1 | 346.6 | 2.87 |
| N | 12 | 68.9  | 96.8  | 109.5 | 111.6 | 111.6 | 119.6 | 1.01 |
| O | 13 | 43.5  | 56.8  | 59.6  | 61.5  | 64.7  | 69.1  | 1.00 |

As is seen from the results shown above, when neopentyl glycol or 1,6-hexanediol alone or a polyhydric component containing more than 20 mole % of neopentyl glycol or 1,6-hexanediol is used in preparing an unsaturated alkyd resin to be employed for preparing the starting liquid composition of this invention, it is possible to obtain a liquid composition of a low thixotropy and a low viscosity in which the change of the viscosity during the lapse of time is extremely low.

The above liquid compositions I to O were heated at 120°C for 25 minutes in the same manner as in Example 1 to obtain partially-cured compositions. Then, these partially-cured compositions were heated at 150° for 3 minutes to obtain final cured products. Properties of these final cured products were almost similar to those of Sample 7 shown in Table 6.

What we claim is:

1. A process for the preparation of a molded article from a thermosetting resin of the unsaturated alkyd type, which comprises heating at a temperature ranging from 80° to 160°C, a liquid composition obtained by sufficiently agitating and blending a mixture comprising (A) 5 to 70% by weight of an unsaturated alkyd resin having an average degree of condensation of at least 4 and a number average molecular weight of at least 1,000 and which is a condensation product of an unsaturated polycarboxylic acid with a polyhydric alcohol, (B) 20 to 70% by weight of a vinyl monomer selected from the group consisting of styrene, chlorostyrene, tert-butyl styrene, vinyl toluene, divinyl benzene, vinyl acetate and mono esters of acrylic acid or methacrylic acid, (C) 10 to 65% by weight of a vinyl chloride resin which is a homopolymer of vinyl chloride or a copolymer of vinyl chloride with a minor amount of a copolymerizable vinyl monomer and (D) 0.2 to 3% by weight of a polymerization initiator, to such an extent that the composition is not completely cured, cooling the composition to obtain a partially-cured non-tacky solid composition of a moldable form, and heating the partially-cured composition at a temperature ranging from 120° to 180°C to complete the curing.

2. A process for the preparation of a molded article as set forth in claim 1, wherein the unsaturated alkyd resin is a condensation product formed from (i) 1 mole equivalent of an unsaturated dicarboxylic acid or a mixture of an unsaturated dicarboxylic acid with a saturated aliphatic dicarboxylic acid or aromatic dicarboxylic acid and (ii) 1 to 1.2 mole equivalents of neopentyl glycol or 1,6-hexanediol, or 1 to 1.2 mole equivalents of a mixture of at least 0.2 mole equivalent of neopentyl glycol, 1,6-hexanediol or both with another polyhydric alcohol.

3. A process for the preparation of a molded article as set forth in claim 1, wherein the vinyl chloride resin is a vinyl chloride resin powder for paste which has an average degree of a polymerization ranging from 500 to 2,500 and an average size of from 0.05 to 50 microns.

4. A process for the preparation of a molded article as set forth in claim 1, wherein the vinyl monomer is styrene or a mixture of styrene with other vinyl monomer.

5. A process for the preparation of a molded article as set forth in claim 1, wherein the polymerization initiator is (a) a polymerization initiator in which the decomposition temperature necessary for obtaining a half-value period of 1 minute is higher than 150°C or (b) a mixture composed of at least 80% by weight of said polymerization initiator (a), the balance being another polymerization initiator in which the decomposition temperature necessary for obtaining a half-value period of 1 minute is not higher than 150°C.

6. A process for the preparation of a molded article from a thermosetting resin of the unsaturated alkyd type, which comprises heating at a temperature ranging from 80° to 160°C a liquid composition obtained by sufficiently agitating and blending a mixture comprising (A) 5 to 70% by weight of an unsaturated alkyd resin having an average degree of condensation of at least 4 and a number average molecular weight of at least 1,000 and which is a condensation product of an unsaturated polycarboxylic acid with a polyhydric alcohol, (B) 20 to 70% by weight of a reactive plasticizer selected from the group consisting of alkyl esters of polycarboxylic acids, diesters of α,β- unsaturated dibasic acids in which the alcohol moiety has 4 to 16 carbon atoms and esters having the formula

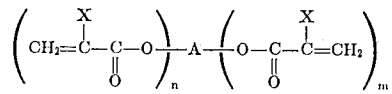

wherein A is a residue of a compound having at least two hydroxyl groups at the molecule ends or a compound having at least one ester or ether linkage in the molecule and at least two terminal hydroxy groups; X stands for a hydrogen or halogen atom or an alkyl group such as methyl and ethyl groups; and n and m are selected from integers of 1 to 3 or a mixture of said reactive plasticizer with a vinyl monomer selected from the group consisting of styrene, chlorostyrene, tert-butyl styrene, vinyl toluene, divinyl benzene, vinyl acetate and mono esters of acrylic acid or methacrylic acid, (C) 10 to 65% by weight of a vinyl chloride resin which is a homopolymer of vinyl chloride or a copolymer of vinyl chloride with a minor amount of a copolymerizable vinyl monomer and (D) 0.2 to 3% by weight of a polymerization initiator, to such an extent that the composition is not completely cured, cooling the composition to obtain a partially-cured non-tacky solid composition of a moldable form, and heating the partially-cured composition at a temperature ranging from 120° to 180°C to complete the curing.

7. A process for the preparation of a molded article as set forth in claim 6, wherein the unsaturated alkyd resin is a condensation product formed from (i) 1 mole equivalent of an unsaturated dicarboxylic acid or a mixture of an unsaturated dicarboxylic acid with a saturated aliphatic dicarboxylic acid or aromatic dicarboxylic acid and (ii) 1 to 1.2 mole equivalents of neopentyl glycol or 1,6-hexanediol, or 1 to 1.2 mole equivalents of a mixture of at least 0.2 mole equivalent of neopentyl glycol, 1,6-hexanediol or both with another polyhydric alcohol.

8. A process for the preparation of a molded article as set forth in claim 6, wherein the vinyl monomer is styrene or a mixture of styrene with other vinyl monomer.

9. A process for the preparation of a molded article as set forth in claim 6, wherein the reactive plasticizer is at least one member selected from the group consisting of compounds expressed by the following formula

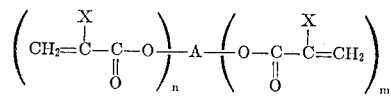

wherein A is a residue of a compound having at least two hydroxyl groups at the molecule ends or a compound having at least one ester or ether linkage in the molecule and at least two terminal hydroxyl groups; X stands for a hydrogen or halogen atom or an alkyl group having 1 to 2 carbon atoms; and n and m are selected from integers of 1 to 3.

10. A process for the preparation of a molded article as set forth in claim 6, wherein the polymerization initiator is (a) a polymerization initiator in which the decomposition temperature necessary for obtaining a half-value period of 1 minute is higher than 150°C or (b) a mixture composed of at least 80% by weight of said polymerization initiator (a), the balance being another polymerization initiator in which the decomposition temperature necessary for obtaining a half-value period of 1 minute is not higher than 150°C.

* * * * *